United States Patent [19]
Jackson

[11] Patent Number: 6,042,156
[45] Date of Patent: Mar. 28, 2000

[54] OVERCENTER DOUBLE JAW LATCH MECHANISM

[75] Inventor: Frank Thomas Jackson, Lake Elsinore, Calif.

[73] Assignee: Hartwell Corporation, Placentia, Calif.

[21] Appl. No.: 09/132,367

[22] Filed: Aug. 11, 1998

[51] Int. Cl.⁷ ..................................................... E05C 7/00
[52] U.S. Cl. ............................... 292/26; 292/8; 292/250; 292/247; 292/DIG. 31
[58] Field of Search .................................. 292/26, 48, 52, 292/8, 7, 58, 250, 29, DIG. 31, DIG. 49, 247, 11, 27, 46, 47, DIG. 14

[56] References Cited

U.S. PATENT DOCUMENTS

| | | | |
|---|---|---|---|
| 2,693,099 | 11/1954 | Vigmostad | 292/26 |
| 2,710,214 | 6/1955 | Summers | 292/247 |
| 2,927,812 | 3/1960 | Smith et al. | 292/DIG. 31 |
| 3,259,411 | 7/1966 | Griffiths | 292/DIG. 31 |
| 4,231,597 | 11/1980 | Pelcin | 292/164 |
| 5,058,939 | 10/1991 | Miilu | 292/110 |
| 5,620,212 | 4/1997 | Bourne et al. | 292/113 |
| 5,738,393 | 4/1998 | Chao | 292/216 |

*Primary Examiner*—Darnell M. Boucher
*Assistant Examiner*—John B. Walsh

*Attorney, Agent, or Firm*—Pretty, Schroeder & Poplawski

[57] ABSTRACT

A double jaw latch mechanism for releasably securing a moveable structure to a keeper. The moveable structure may be an aircraft cowling and the keeper may be mounted to an aircraft structure. The double jaw latch includes a handle rotatably mounted to a housing. The handle has an open position, a closed position, and a pre-catch position. The handle is connected to a double jaw assembly which likewise has an open position, a closed position, and a pre-catch position. The double jaw assembly includes a first jaw and a second jaw mounted in pivoted relation for movement to and from each other to engage the keeper. When the double jaw latch is in the open position, the jaws are spaced apart to permit disengagement with the keeper. In the closed position, the jaws are trapped within the housing and rigidly retain the keeper. In the pre-catch position, the jaws are urged together such that the jaws may yield to pressure exerted by the keeper and may accept and retain the keeper, and thereafter securely retain the keeper. The double jaw latch includes a linking mechanism connecting the handle to the double jaw assembly which moves in a generally longitudinal direction for movement of the double jaw assembly. The double jaw latch includes a detent which secure the jaws in the pre-catch position and a sensor pivotally connected to the housing which prevents the latch from closing when the keeper is not engaged.

16 Claims, 11 Drawing Sheets

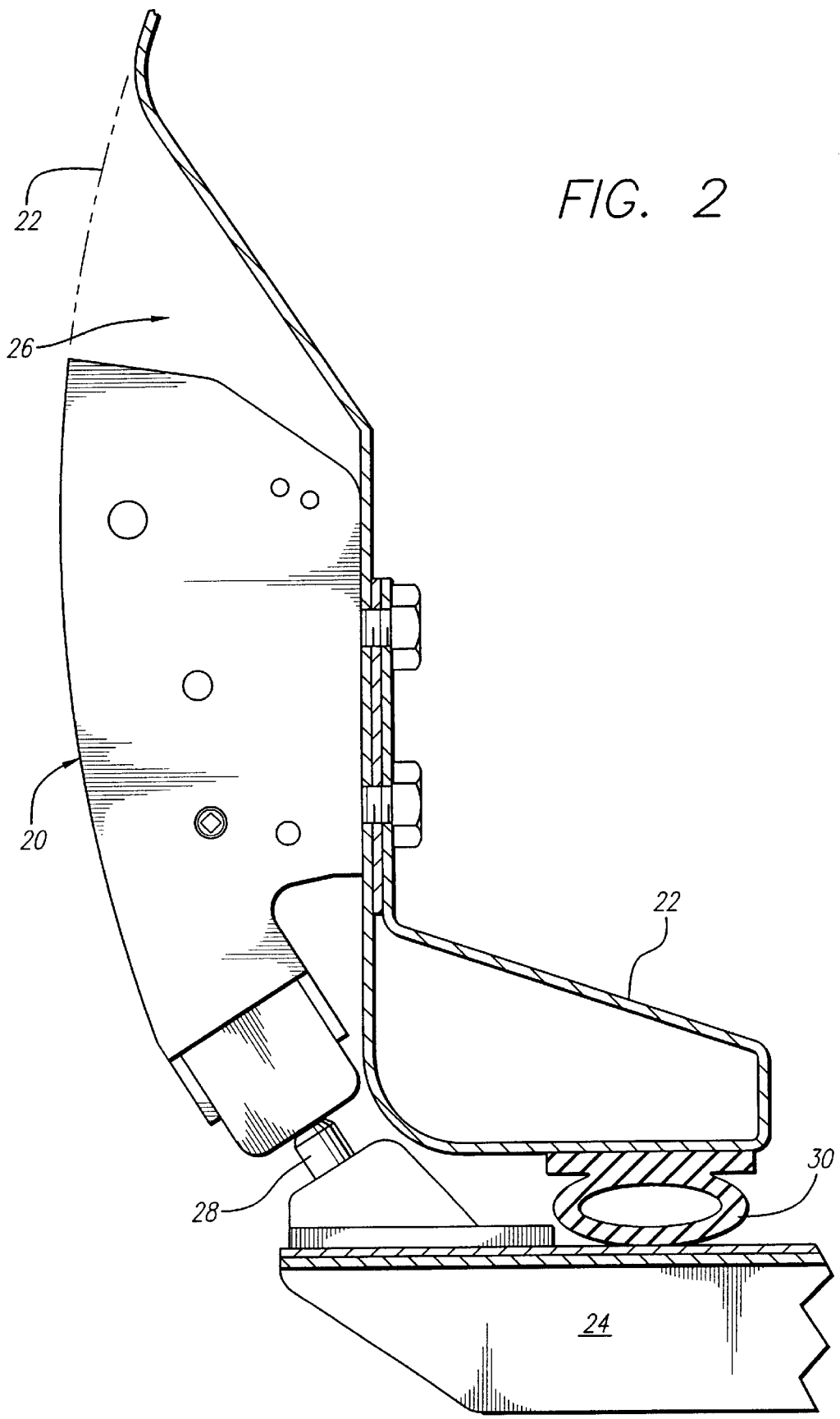

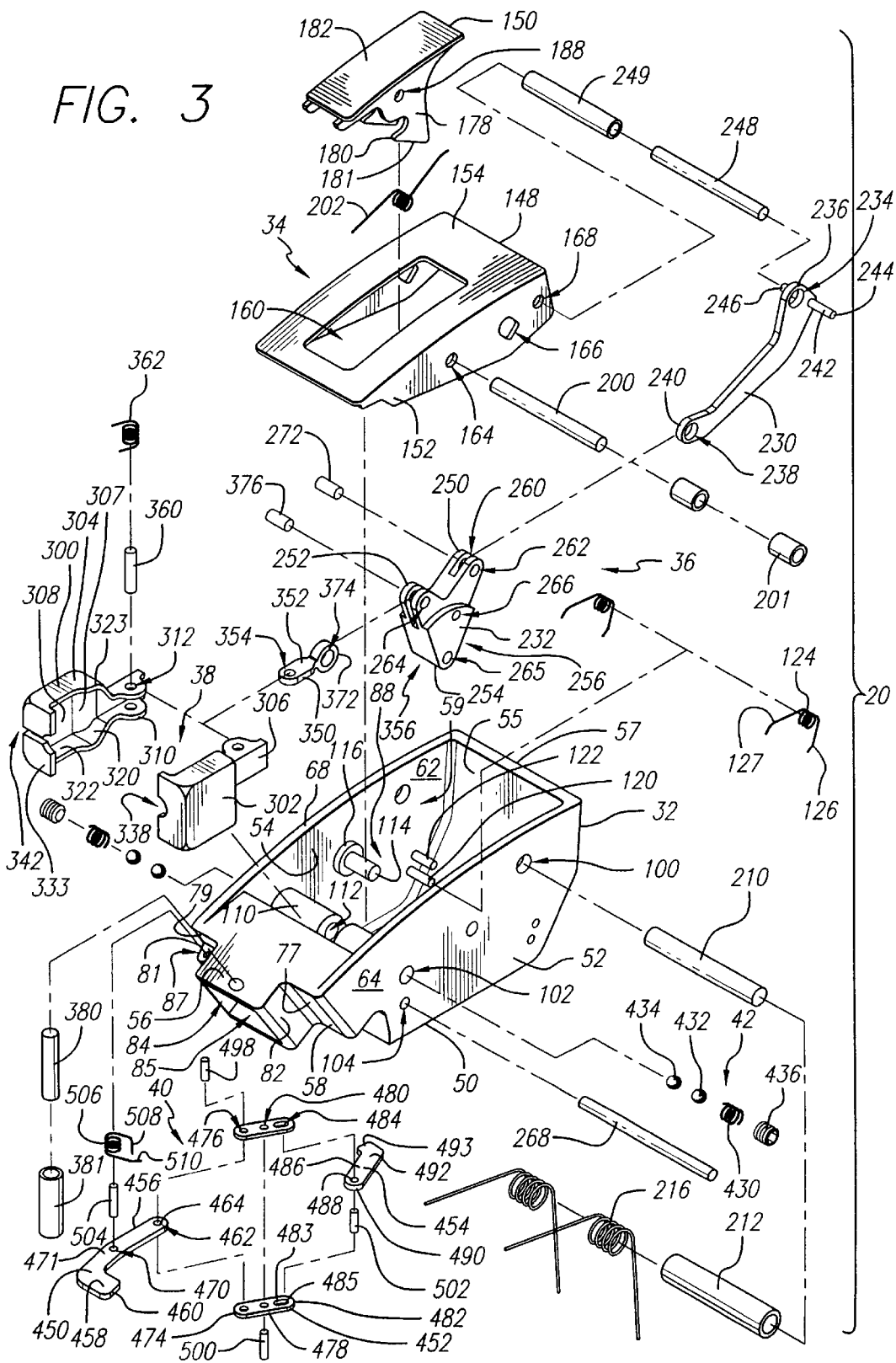

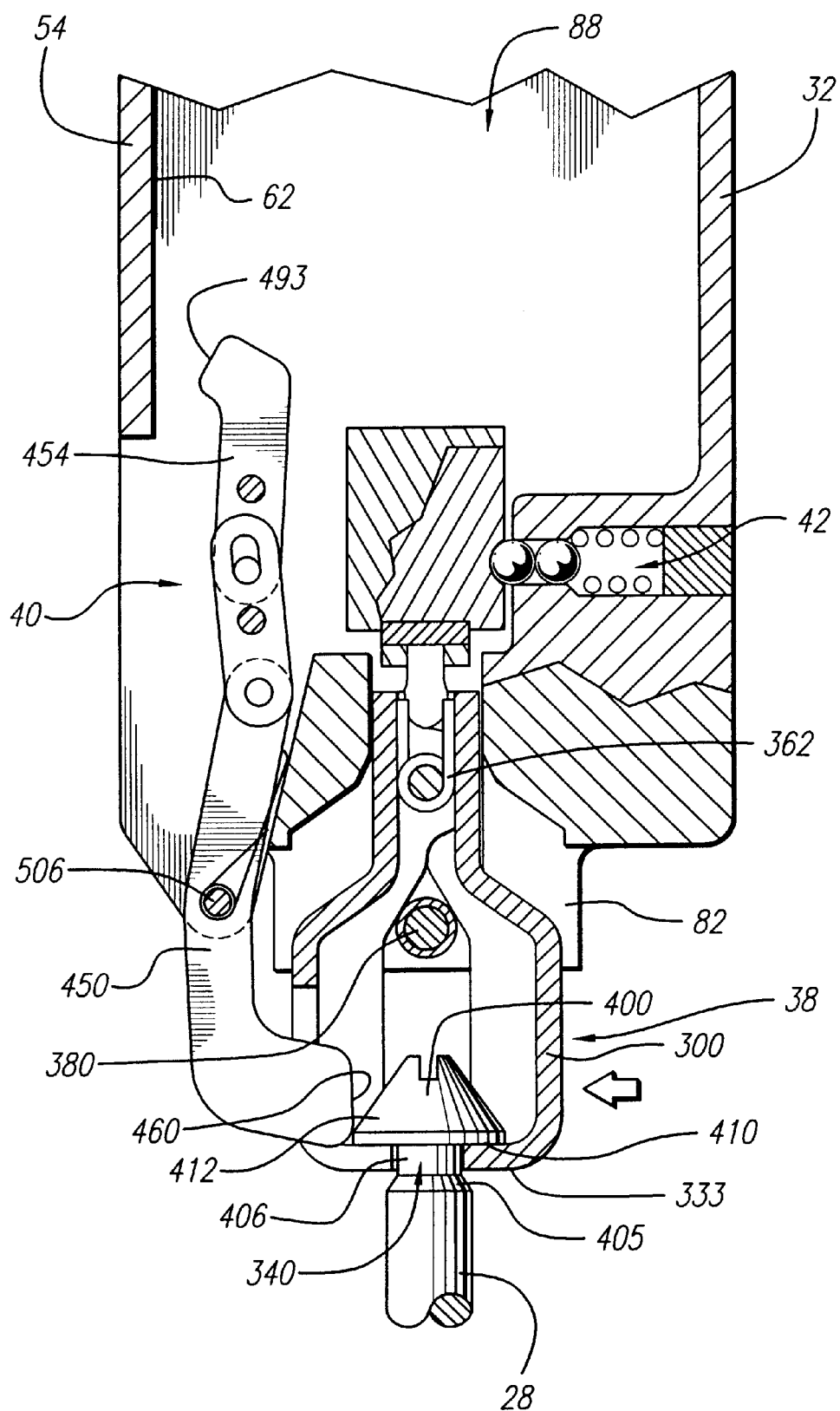

OVERCENTER DOUBLE JAW LATCH MECHANISM

The present invention relates generally to the field of latch mechanisms and, more particularly, to an overcenter double jaw latch mechanism which secures a cowling to an aircraft structure. Although the present invention is subject to a wide range of applications, it is especially suited for use with aircraft, and will be particularly described in that connection.

BACKGROUND OF THE INVENTION

Various types of latching mechanisms have been developed for mounting and/or locking aircraft panels, such as engine cowlings, to one another or to an aircraft structure. Many of these standard latching mechanisms employ a keeper, a hook to engage the keeper, a mounting linkage for mounting the hook to the aircraft structure, and a handle to actuate the latch through the mounting linkage. In such devices, overcenter locking mechanisms associated with the mounting linkage establish rigid retention of the aircraft panel with the latch and the corresponding aircraft panel or structure in the closed state. The handle controls the overcenter mechanism and is itself independently latched into place in the closed position.

Overcenter latching mechanisms are often used for securing engine cowlings to an aircraft structure. An engine cowling usually forms a conical shaped structure that wraps around an aircraft engine. Engine cowlings at their top ends are normally hingedly connected to the aircraft structure so that they can be pivoted upwards to provides access to the engine for maintenance or repair. During aircraft operation the engine cowlings must be pivoted downwards into closed positions and secured at their bottom ends to the aircraft structure by latching mechanisms.

A disadvantage of using standard overcenter latching mechanisms for securing a cowling to an aircraft structure is that these latches require a complete manual closing. For example, a persistent problem associated with helicopter cowlings occurs after the required maintenance or repair is performed on the helicopter engines. Mechanics will pivot the cowling downwards but will sometimes forget to close the overcenter latch or will not close the overcenter latch completely. Oftentimes, this is because the mechanics are in a hurry to return the helicopter to operation. When these overcenter latches are not completely closed a potentially unsafe flight condition may occur. For example, the cowling could possibly open into the blades of the helicopter.

Another type of latch designed for securing aircraft cowlings is described in U.S. Pat. No. 3,515,421 to Poe and Brockway. This patent describes a latch with a pair of opposed pivotally connected keeper jaws which move longitudinally in a housing between an open position to receive and release a keeper pin, a pre-catch position yieldable to pressure exerted by the keeper pin to receive and retain the keeper pin, and a closed position for securing the keeper pin. The keeper jaws of this latch are manipulated by a transversely extending slide containing a stepped slot which operates laterally with respect to the direction of movement of the keeper jaws and the keeper pin. The transversely extending slide extends through the housing. After the opposed jaw latch is opened the latch will automatically bias to the pre-catch position. From the pre-catch position, the opposed jaw latch can be closed by the use of a handle or by the slamming of the cowling to its closed position. The pre-catch position of this latch provides a safety feature such that when the cowling is pivoted downward the keeper jaws may yield to the pressure exerted by the keeper pin and the latch may accept and retain the keeper pin between the keeper jaws. Therefore, if the mechanic forgets to manually close the opposed jaw latch, the jaws may still accept and retain the keeper pin during flight possibly obviating a potentially unsafe flight condition due to the cowling opening during flight. Although this type of latch has been used previously with aircraft, the opposed jaw latch has many disadvantages.

A disadvantage of the opposed jaw latch is that it operates laterally by means of a transversely extending slide containing a stepped slot which extends through the housing making the opposed jaw latch prone to open from its closed and pre-catch positions. Disadvantageously, the laterally operable slide is very susceptible to forces encountered during flight and is inherently unstable. The slide is likely to move in reaction to these forces which may cause the opposed jaw latch to open from the closed position. Similarly, the lateral operation of the slide makes the opposed jaw latch prone to open from the pre-catch position as well. From both the closed and the pre-catch positions, the opposed jaw latch is prone to open, possibly allowing the cowling to pivot upwards during flight.

A disadvantage of the opposed jaw latch, as well as the standard overcenter latches, is that if the keeper pin is missing, broken, or not in the proper position, it still may be possible to close the latch without properly engaging the keeper pin. As previously described, this may result in the cowling opening during flight. A further disadvantage associated with these latches, is that there is no way for the mechanic to visually verify whether or not these latches have properly closed, since the handles associated with these latches will still close regardless of whether the latches have correctly engaged the keeper pin. Therefore, the mechanic operating theses types of latches can never be sure that the latch has properly closed.

A further disadvantage of the opposed jaw latch is that in the closed position the jaws are loosely held in place by the housing. Since the jaws are loosely held in place by the housing, the opposed jaw latch does not adequately retain the keeper pin. Similarly, in the pre-catch position, the jaws of the opposed jaw latch do not adequately retain the keeper pin.

In view of the above, it should be appreciated that there is a need for an overcenter double jaw latch mechanism that provides the advantages of having a double jaw latch that is secure in the closed and pre-catch positions and not prone to inadvertently open, is inherently stable, prevents the latch from closing without properly engaging the keeper pin and alerts the mechanic of this condition by not allowing the handle to close, and has a housing that rigidly retains the keeper pin in the closed position and securely retains the keeper pin in the pre-catch position. The present invention satisfies these and other needs and provides further related advantages.

SUMMARY OF THE INVENTION

The present invention is embodied in an overcenter double jaw latch mechanism that is secure in the closed and pre-catch positions and not prone to inadvertently open, is inherently stable, prevents the latch from closing without properly engaging the keeper pin and alerts the mechanic of this condition by not allowing the handle to close, and has a housing that rigidly retains the keeper pin in the closed position and securely retains the keeper pin in the pre-catch position.

The double jaw latch mechanism of the present invention is used for releasably securing a moveable structure to a keeper. Preferably, the moveable structure may be an aircraft cowling and the keeper may be mounted to another structure such as an aircraft structure. The double jaw latch includes a handle rotatably mounted to a housing. The handle has an open position, a closed position, and a pre-catch position. The handle is connected to a double jaw assembly which likewise has an open position, a closed position, and a pre-catch position. The double jaw assembly includes a first jaw and a second jaw mounted in pivoted relation for movement to and from each other to engage the keeper. When the double jaw latch is in the open position, the jaws are spaced apart to permit disengagement with the keeper. In the closed position, the jaws are trapped within the housing and rigidly retain the keeper. In the pre-catch position, the jaws are urged together such that the jaws may yield to pressure exerted by the keeper and may accept and retain the keeper, and thereafter securely retain the keeper.

An important feature of the present invention is that the double jaw latch mechanism includes a linking mechanism that is directly connected to the double jaw assembly for movement of the double jaw assembly between the open and closed positions. The linking mechanism moves in a generally longitudinal direction, relative to the double jaw assembly, to actuate the double jaw assembly. The longitudinal movement of the linking mechanism overcomes the difficulties associated with the use of latches using laterally operable slides which extend through the housing. These types of latches do not adequately prevent the latch from opening due to forces encountered during flight which tend to move the slide and open the latch from the closed position. Since the linking mechanism of the double jaw latch moves in a generally longitudinal direction and is completely contained within the housing when the double jaw latch is in the closed position, the double jaw latch is less likely to open due to forces encountered during flight. Advantageously, the linking mechanism of the double jaw latch provides a latch that is secure in the closed position, not prone to inadvertently open, maintains a more controlled latching operation, and is inherently stable.

Another significant feature of the present invention is that when the double jaw latch mechanism is closed it has an overcenter position. The overcenter position of the latch mechanism advantageously establishes rigid retention of the cowling with the aircraft structure while the double jaw latch is closed.

A further feature of the present invention is that it possesses a detent to secure the jaws of the double jaw latch mechanism in the pre-catch position. This pre-catch detent may comprise a pair of spring and ball assemblies which engage the linking mechanism of the double jaw latch such that the double jaw latch and its jaws are secured in the pre-catch position. Therefore, after the double jaw latch and the cowling have been opened, and the double jaw latch has biased to the pre-catch position, both the double jaw latch and its jaws will be secured in the pre-catch position. As discussed previously, after the required engine repair or maintenance is performed, mechanics will pivot the cowling downwards towards its closed position and will sometimes forget to close the double jaw latch. The pre-catch position of the double jaw latch provides a safety feature such that the jaws may yield to the pressure exerted by the keeper pin and the jaws may accept and retain the keeper pin. Advantageously, the jaws will be secured in the pre-catch position by the spring and ball assemblies increasing the likelihood that the jaws will be able to retain the keeper pin during flight. Therefore, the chance of a potentially unsafe flight condition due to the cowling opening during the subsequent flight of the aircraft is decreased.

Another significant feature of the present invention is that the double jaw latch mechanism includes a safety feature. The safety feature includes a sensor having a blocking and an unblocked position which is pivotally connected to the housing for movement between the blocking and the unblocked position. The sensor is biased to the blocking position. In the blocking position the sensor prevents the handle, and consequently the latch, from closing. Advantageously, if the mechanic attempts to close the latch by closing the handle or slamming the cowling downwards and the sensor does not properly engage the keeper pin, the sensor will remain in the blocking position and will prevent the handle and the latch from closing. Conversely, if the sensor does properly engage the keeper pin the sensor will be rotated to the unblocked position allowing the handle and the latch to close properly. This is advantageous because it insures that when the handle is closed, that the keeper pin is properly engaged, and that the latch is properly closed. If the latch does not properly close, as sometimes occurs in prior art devices where the latch can close without properly engaging the keeper pin, a potentially unsafe flight condition could occur. Advantageously, the sensor of the present invention insures that when the handle is closed, the latch is properly closed, and a potentially unsafe flight condition will probably not occur due to the jaws of the latch not properly engaging the keeper pin. A further related advantage of the sensor is that when the latch does not close properly, the handle will pivot upwards visually alerting the mechanic that the latch has not closed properly. Conversely, when the handle does close, the mechanic can visually verify that the latch has indeed closed properly.

An additional feature of the present invention is that in the closed position the double jaw assembly of the double jaw latch is trapped within a housing that conforms to the shape of the double jaw assembly and consequently the jaws are rigidly forced shut by the housing. This is advantageous in that the jaws therefore rigidly retain the keeper pin in the closed position. Similarly, the jaws of the double jaw assembly are urged together by the housing in the pre-catch position. Advantageously, the jaws therefore securely retain the keeper pin in the pre-catch position.

Other features and advantages of the present invention will become apparent from the following description of the preferred embodiments, taken in conjunction with the accompanying drawings, which illustrate, by way of example, the principles of the invention.

BRIEF DESCRIPTION OF THE DRAWINGS

FIG. 2A is a side view of the overcenter double jaw latch mechanism of FIG. 1 mounted within an aperture formed within the cowling.

FIG. 3 is an exploded view of the overcenter double jaw latch mechanism of FIG.

FIG. 11 is a sectional view similar to FIG. 5 of the overcenter double jaw latch mechanism in the pre-catch position properly engaged to the keeper pin.

DETAILED DESCRIPTION OF THE PREFERRED EMBODIMENTS

Figure 1:
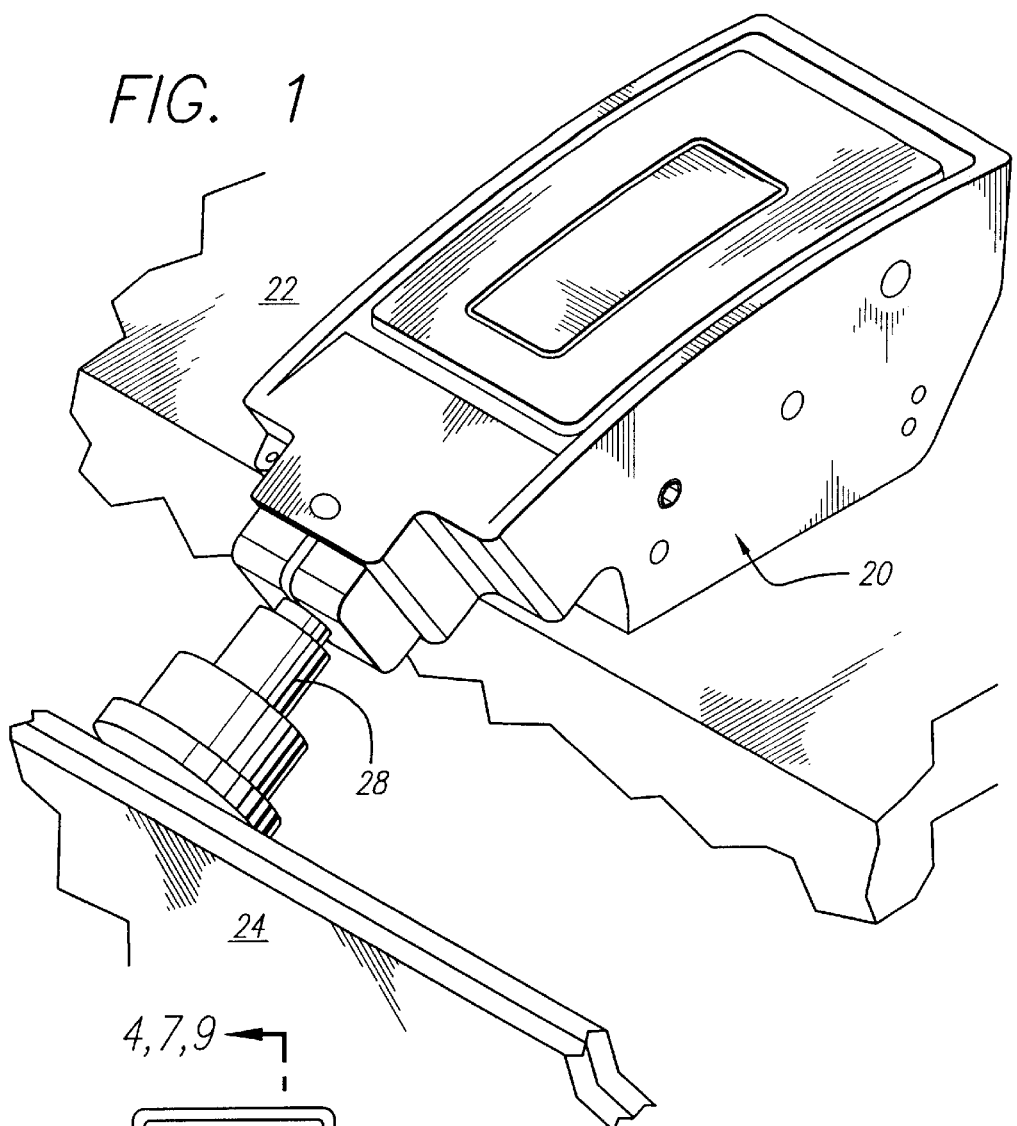
FIG. 1 is a perspective view showing an overcenter double jaw latch mechanism according to the present invention securing a cowling to a corresponding aircraft structure.
Figure 1A:
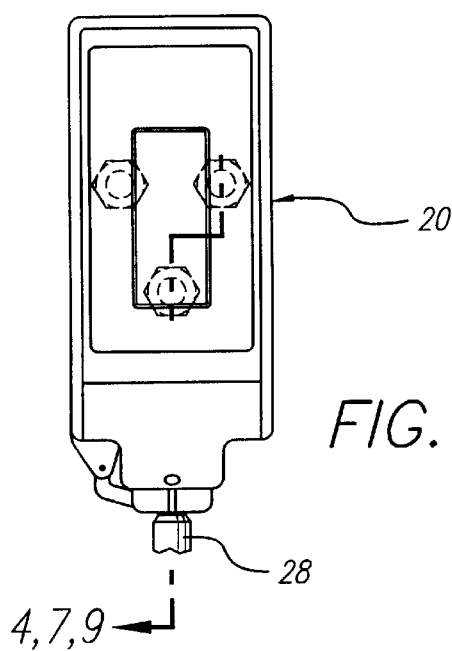
FIG. 1A is a top view of the overcenter double jaw latch mechanism of FIG. 1

As shown in the exemplary drawings, and with particular reference to FIGS. 1, 1A, and 2, the present invention is embodied in an overcenter double jaw latch mechanism 20 for securing an aircraft panel, such as a cowling 22, to a corresponding aircraft structure 24. The latch mechanism 20 is mounted within an aperture 26 formed within the cowling 22. When the latch mechanism 20 is properly closed, the latch closes around and rigidly locks to a keeper pin 28 mounted to the aircraft structure 24. Furthermore, the cowling 22 preferably compresses a gasket 30 sealing the cowling 22 to the aircraft structure 24.

Figure 4:
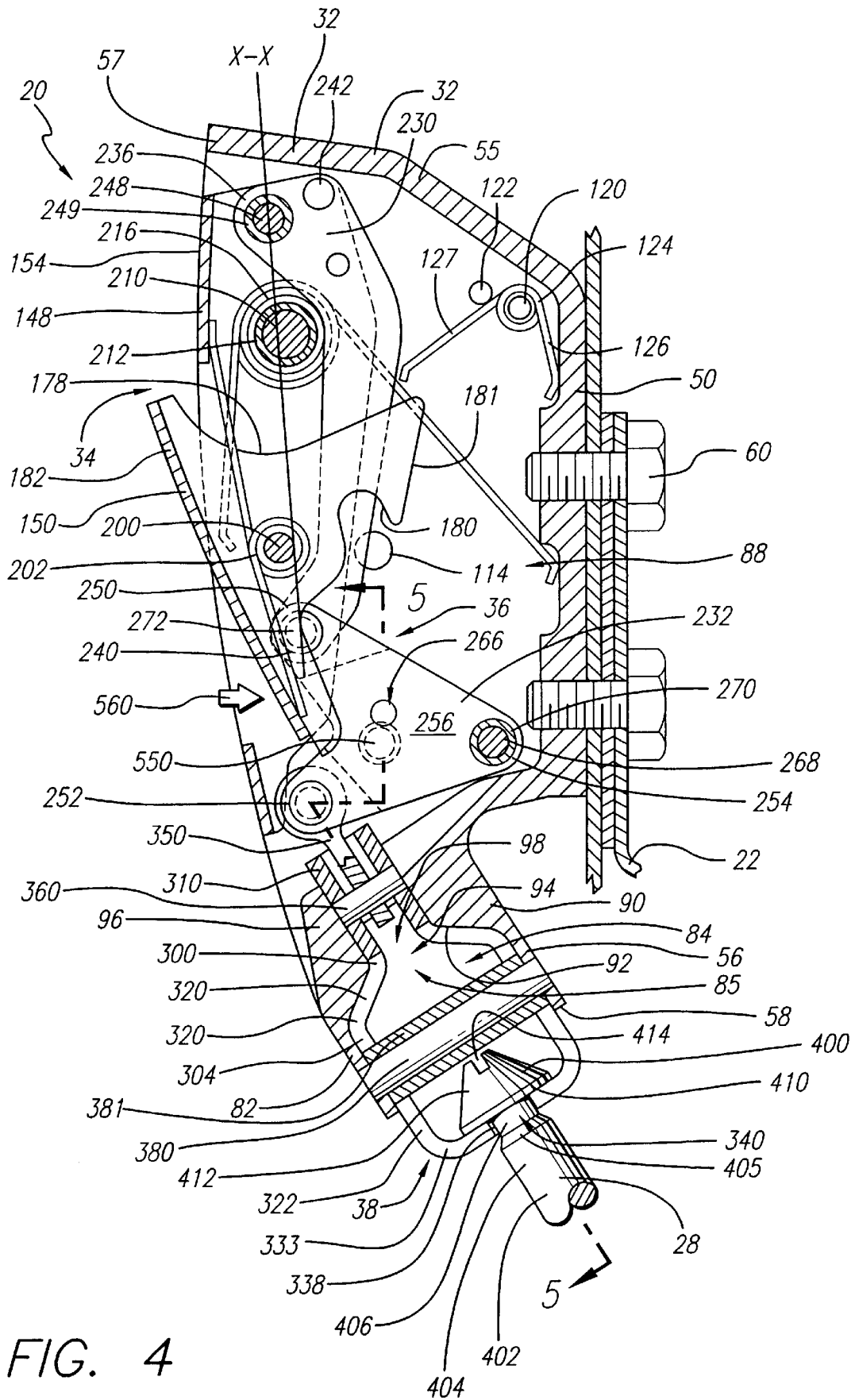
FIG. 4 is a sectional view of the overcenter double jaw latch mechanism taken along line 4—4 of FIG. 1A, showing the double jaw latch mechanism in the closed position.
Figure 5:
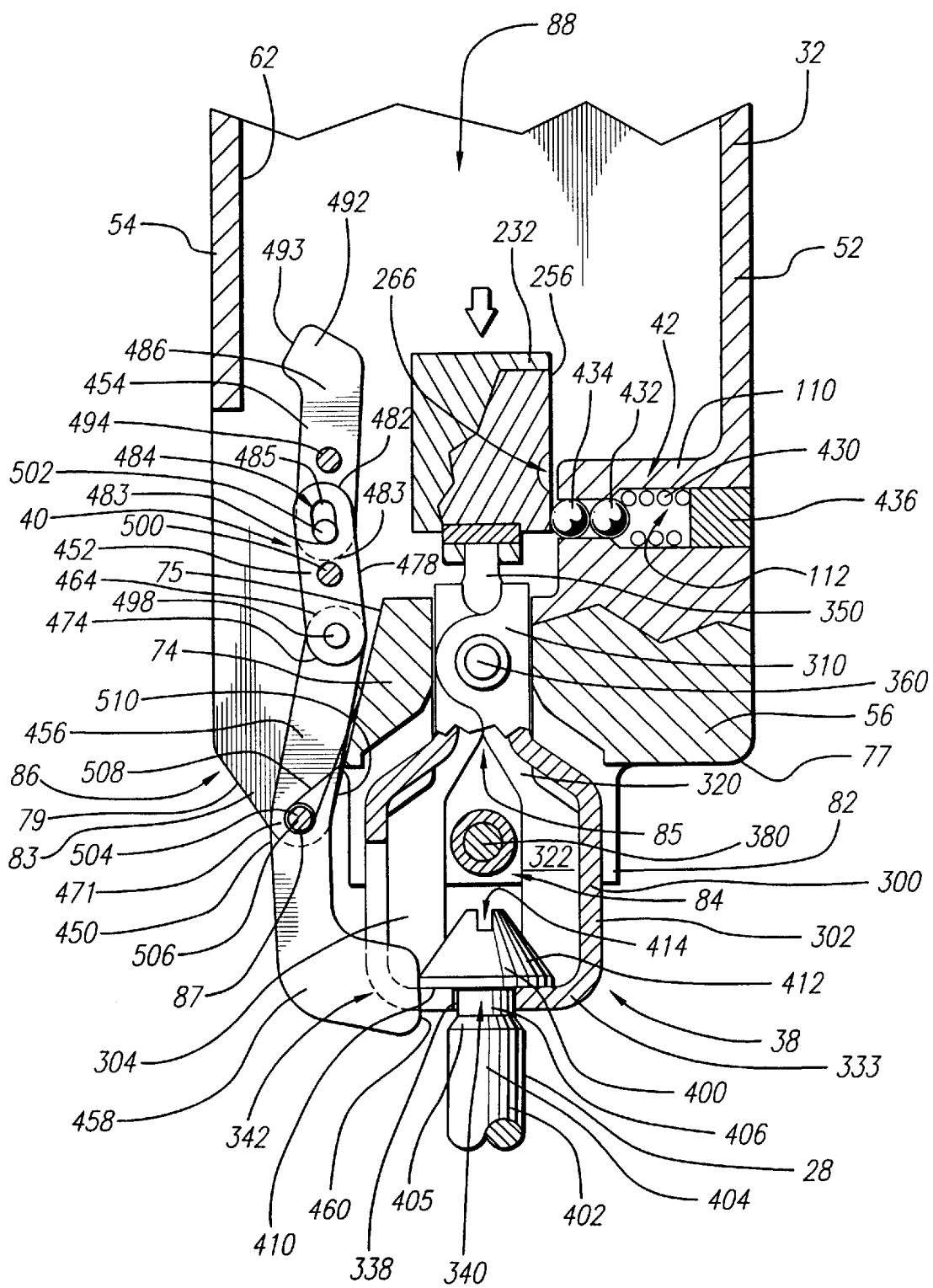
FIG. 5 is a partial sectional view of the overcenter double jaw latch mechanism in the closed position taken along line 5—5 of FIG. 4 illustrating a sensor in the unblocked position.

With reference to FIGS. 3–5, the latch mechanism 20 includes a housing 32, a handle assembly 34, a linking mechanism 36, a double jaw assembly 38, a sensor 40, and a pair of spring and ball assemblies 42. Preferably, the housing 32 comprises a bottom wall 50, a first side wall 52, a second side wall 54, a back wall 55, and a double jaw mount 56. The housing also has a back end 57, a front end 58, and an open top end 59. The latch mechanism 20 is mounted to the cowling 22 by three bolts 60 which fasten the cowling 22 to the bottom wall 50 of the housing 32. The side walls 52 and 54 are spaced apart and are parallel to each other and extend perpendicularly from the bottom wall 50. Each side wall 52 and 54 has an interior surface 62 and an exterior surface 64. The back wall 55 extends from the bottom wall 50 at the back end 57 of the housing 32 and adjoins the side walls. The side walls and the back wall 55 all have top edges 68 which are sloped such that they conform to the curvature of the cowling 22. The housing defines an interior 88 formed between the double jaw mount 56, the back wall 55, the bottom wall 50, and the side walls 52 and 54.

The double jaw mount 56 extends from the bottom wall 50 and adjoins the side walls 52 and 54. Preferably, the double jaw mount 56 defines a first slanted wall 77, a second slanted wall 79, and a tapered end wall 75. The double jaw mount 56 also preferably includes a first rectangular portion 82 forming a rectangular aperture 84, a second portion 90 having angled walls 92 forming a tapered aperture 94, and a third portion 96 forming a second rectangular aperture 98 which is smaller than the rectangular aperture 84 formed by the first portion 82. The interior space formed by the apertures defines a take-up cavity 85 that conforms to the shape of the double jaw assembly 38 and that is designed for receiving the double jaw assembly.

Preferably, the second side wall 54 of the housing 32 and the second slanted wall 79 of the double jaw mount 56 define a slot 86. The slot 86 extends transversely through second side wall 54 and the second slanted wall 79 for receiving the sensor 40. The second slanted wall also includes a first top tab 81 and a second bottom tab 83. Preferably, each tab has a mounting hole 87 for mounting the sensor 40 through the slot 86 as will be discussed later.

A cylindrical sleeve 110 with a bore 112 for receiving a spring and ball assembly 42 extends from the interior surface 62 of each side wall 52 and 54 into the interior 88 of the housing 32. The bores 112 align with a set of aligned holes 102 in the side walls 52 and 54. An anchor pin 114 extends through each side wall 52 and 54 into the interior of the housing. Washers 116 located around the anchor pins 114 are mounted to the interior surface 62 of each side wall to reinforce the anchor pins. Also, a pair of first and second pins 120 and 122 extend through each side wall into the interior of the housing. The pair of first and second pins 120 and 122 are located adjacent to the back wall 55 near the bottom wall 50. A torsional spring 124 is coiled about each pin 120. Each spring 124 has a first leg 126 and a second leg 127. The first legs 126 bear against the bottom wall 50 of the housing. The second legs 127 are used to bias the linking mechanism 36 such that the double jaw latch mechanism 20 returns automatically to the pre-catch position after opening as will be discussed later. Preferably, the pins are flush-riveted to the side walls of the housing.

A handle assembly 34 including a handle 148 and a trigger lock 150 is adapted to fit within the open top end 59 of the housing 32. The handle 148 is generally U-shaped in cross section and includes a pair of flanges 152 with an upper plate 154 therebetween. The upper plate 154 includes a slot 160 for receiving the trigger lock 150 and is preferably sloped such that it conforms with the curvature of the cowling 22. Also, the flanges 152 are spaced apart and are parallel to each other.

The trigger lock 150 is adapted to fit within the slot 160 of the handle 148. The trigger lock 150 is generally U-shaped in cross section and includes a pair of depending legs 178 which terminate in hooked ends 180 having angled surfaces 181. The trigger lock 150 has an upper wall 182 that completely fills the slot 160 of the handle and is also sloped such that it conforms with the curvature of the cowling 22. The depending legs 178 are spaced apart and are parallel to each other and extend perpendicularly from the upper wall.

The trigger lock 150 is pivotally mounted to the handle 148 by a first mounting pin 200. The mounting pin extends through aligned holes 164 of the flanges 152 of the handle and through aligned holes 188 of the depending legs 178 of the trigger lock such that the trigger lock may be pivoted between a flush position and an angled position relative to the handle. Preferably, the mounting pin 200 is riveted to the flanges of the handle. Also, spacers 201 may surround the mounting pin between the flanges of the handle and the depending legs. A torsional spring 202 may be coiled about the mounting pin 200 between the depending legs 178. The spring 202 bears against the upper wall 182 of the trigger lock and the upper plate 154 of the handle in such a manner as to bias the trigger lock towards a flush position relative to the handle. When the handle is closed and the trigger lock is in a flush position relative to the handle, the hooked ends 180 engage the protruding ends of the anchor pins 114. It should be noted that in FIG. 4, the trigger lock is at an angled position relative to the handle and in opposition to the action of the spring 202.

Figure 9:
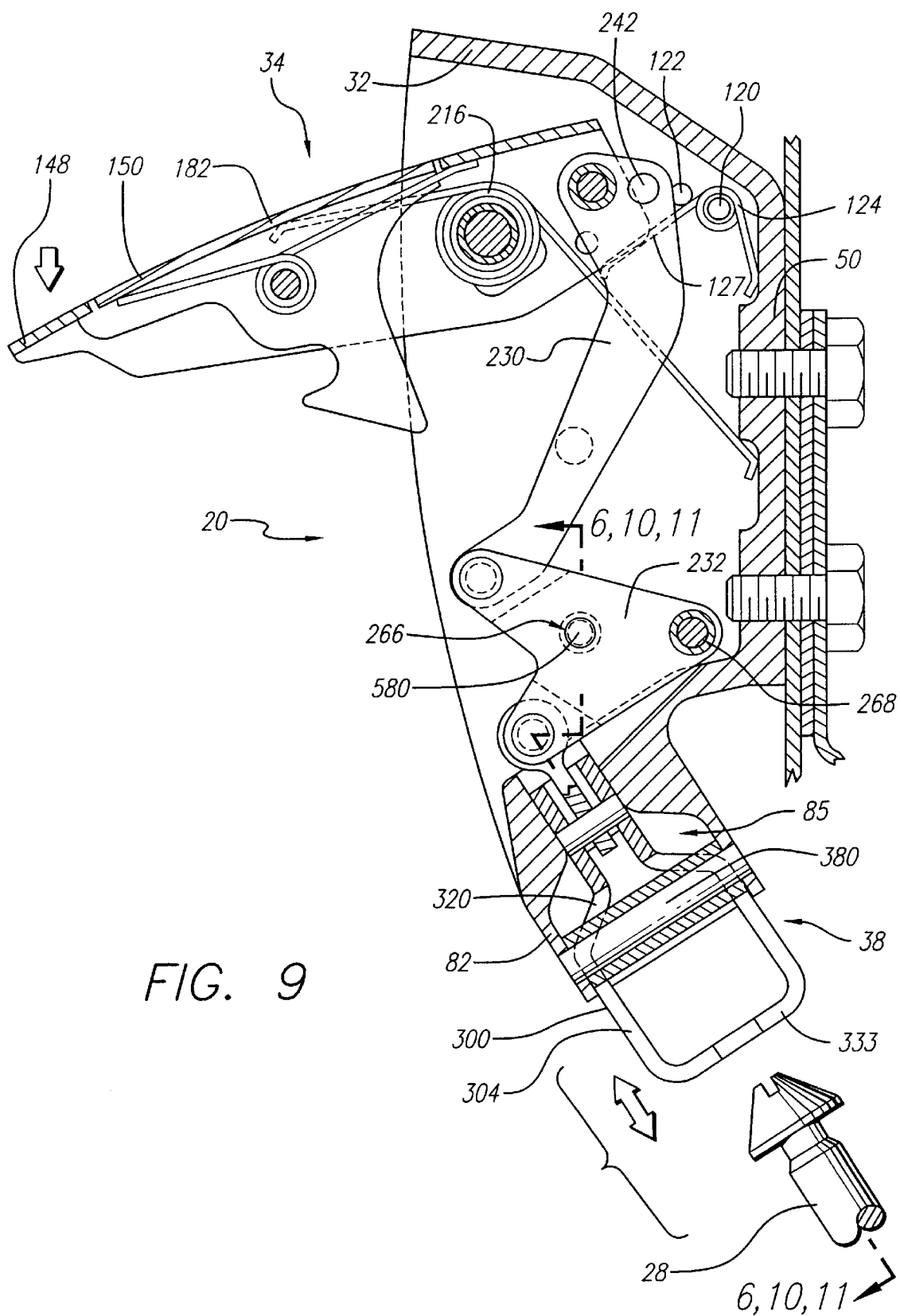
FIG. 9 is a sectional view similar to FIG. 4 of the overcenter double jaw latch mechanism in the pre-catch position.

Similarly, the handle assembly 34 is pivotally mounted to the housing 32. A second mounting pin 210, preferably surrounded by a bushing 212, extends through a set of aligned holes 100 of the side walls 52 and 54 of the housing 32 and through a set of aligned holes 166 of the flanges 152 of the handle 148. The handle assembly 34 may therefore pivot about the surrounding bushing 212 and the mounting pin 210 relative to the housing. Preferably, the mounting pin 210 is flush-riveted to the side walls of the housing. A pair of torsional springs 216 are coiled about the bushing 212 and the mounting pin 210 and are located between the flanges 152 of the handle 148. The springs 216 are compressed when the handle assembly 34 is in the closed position as shown in FIG. 4. In the closed position the handle assembly is flush relative to the housing. When the handle assembly is in the closed position, the torsional springs 216 bear against the bottom wall 50 of the housing and the upper wall 182 of the trigger lock 150 of the handle assembly in such a manner as to bias the handle assembly upwards in a clockwise direction relative to the housing (see FIG. 9).

Preferably, the linking mechanism 36 comprises a shaft arm 230 and a rotatable cam 232. The shaft arm 230 may be a curved elongated member having a first hole 234 at a first end 236 and a second hole 238 at a second end 240. Also a biasing pin 242 having a first side 244 and a second side 246 extends transversely through the first end 236 of the shaft arm 230. The shaft arm 230 may preferably be mounted to the handle assembly 34 by a push rod 248. The push rod 248, preferably surrounded by a bushing 249, extends through a set of aligned holes 168 of the flanges 152 of the handle 148 and through the first hole 234 of the shaft arm. Preferably, the push rod 248 is riveted to the flanges of the handle.

The rotatable cam 232 is preferably a V-shaped member having a first comer 250, a second comer 252, a third comer 254, and two side walls 256. The first and second comers 250 and 252 have axially extending slots 260 and transversely extending holes 262 and 264. The third comer 254 also has a transversely extending hole 265. The side walls 256 of the cam may have centrally located concave depressions 266 for receiving a ball from the spring and ball assemblies 42 which will be discussed later. The cam may be pivotally mounted to the housing 32 by a cross pin 268, preferably surrounded by a bushing 270, which extends through a set of aligned holes 104 of the side walls 52 and 54 of the housing and through the transversely extending hole 265 of the third comer 254 of the cam. Preferably, the cross pin 268 is flush-riveted to the side walls of the housing. The cam may therefore pivot about the surrounding bushing 270 and the cross pin 268 relative to the housing. Furthermore, the cam 232 may preferably be connected to the shaft arm 230 by a connecting pin 272. The second end 240 of the shaft arm fits within the slot 260 of the first comer 250 of the cam and the connecting pin 272 extends through the transversely extending hole 262 of the cam and through the second hole 238 of the shaft arm. Preferably, the connecting pin 272 and the cross-pin 268 are cold sweated to the cam.

The double jaw assembly 38 is mounted within the take-up cavity 85 of the double jaw mount 56 of the housing 32. The double jaw assembly 38 includes a pair of jaws 300. Each jaw 300 includes a base wall 302, a pair of side walls 304, and an end wall 333. The base wall 302 includes a flat upper portion 306, a angled trapezoidal middle portion 307 that narrows and angles inward, and a flat rectangular bottom portion 308. The upper portion 306 includes two transversely extending semi-circular tabs 310. Each tab 310 containing an aligned mounting hole 312. Each side wall 304 has an upper portion 320 that narrows and angles inward and a lower portion 322. The lower portion 322 has a tapered portion 323 near its top end and protrudes slightly at its bottom end. The end wall 333 is formed between the base wall and the side walls. Each end wall 333 contains a semi-circular opening 338. Preferably, one of the jaws 300 includes a slit 342 which extends along the center of the base wall 302 and the end wall 333 for receiving the sensor 40 as will be discussed later.

The jaws 300 of the double jaw assembly 38 are pivotally mounted together and are connected to the linking mechanism 36 by a link 350. The tabs 310 of one of the jaws 300 overlap the tabs of the other jaw such that the aligned holes 312 of both pairs of tabs align with one another. The link 350 has a flat planar member 352 with a hole 354 that fits between the overlapping tabs 310 of the jaws such that the hole 354 aligns with the aligned holes 312 of both pairs of tabs. A pivot pin 360 extends through the aligned holes 312 of both pairs of tabs and through the hole 354 of the link pivotally connecting the jaws to one another and connecting the double jaw assembly to the link. A torsional spring 362 is coiled about the pivot pin 360 and bears against the flat upper portion 306 each jaw biasing the jaws together. The link 350 also has a circular collar 372 which is connected at one end of the planar member 352. The circular collar 372 of the link fits within the slot 260 of the second corner 252 of the cam 232. A connecting pin 376 extends through the hole 264 of the cam and through a hole 374 of the circular collar connecting the cam to the first end of the link. Therefore, the link connects the cam of the linking mechanism to the double jaw assembly. Preferably, the pivot pin 360 and the connecting pin 376 are cold sweated to the link.

When the double jaw assembly 38 is in the closed position, as shown in FIGS. 4 and 5, the take-up cavity 85 of the double jaw mount 56 forces the jaws 300 together. When the jaws confront each other the semi-circular openings 338 of the end walls 333 define a circular keeper pin opening 340 which may accept and rigidly retain the keeper pin 28 such that the jaws lock to the keeper pin.

Preferably, a roller pin 380 is mounted transversely through the rectangular portion 82 of the double jaw mount 56 such that it is located between the jaws 300. Preferably, the roller pin 380 may be surrounded by a bushing 381 and is flush-riveted to the rectangular portion 82 of the housing 32. As will be discussed in the operation of the latch mechanism 20, when the double jaw assembly 38 moves towards an open position the upper portions 320 of the side walls 304 will bear against the rolling pin 380 spreading the jaws 300 apart to receive the keeper pin.

The double jaw assembly 38 of the latch mechanism 20 cooperates with the keeper pin 28 which preferably includes an enlarged head 400 and a cylindrical shank 402 having a first cylindrical portion 404, a tapered portion 405, and a second cylindrical portion 406. The shank 402 may be threaded to the aircraft structure 24 so that the position of the keeper pin may be adjusted. The shank 402 terminates in the enlarged head 400 which also forms a shoulder 410. The enlarged head 400 may also be tapered forming a conical cam face 412 and may include a cross-shaped slit 414 at its top end. Below the shoulder 410 of the enlarged head 400 the shank 402 includes the second cylindrical portion 406 which is radially smaller than the first portion of the shank. The tapered portion 405 extends between the second portion and the first portion of the shank.

With reference to FIGS. 3 and 5, the latch mechanism 20 includes a pre-catch detent preferably comprising a pair of spring and ball assemblies 42. Each spring and ball assembly 42 preferably includes a spring 430, a first ball 432, and a second ball 434. The spring and ball assemblies are mounted within the bores 112 of the cylindrical sleeves 110, respectively. The spring and ball assemblies are secured within the sleeves and the housing 32 by set screws 436 which are threaded into the aligned holes 102 of the side walls 52 and 54 of the housing, respectively. The balls 432 and 434 are biased by the spring 430 such that the second ball 434 of each assembly firmly abuts the respective side wall 256 of the cam 232. As the cam rotates relative to the spring and ball assemblies, the second balls ride along the side walls of the cam and in the pre-catch position are captured by the depression 266 in the cam.

The sensor 40 preferably includes a sensor arm 450, a pair of identical links 452, and a second arm 454. The sensor arm 450 is an approximately L-shaped member having a straight portion 456 and a flanged portion 458 having a first end 460. The straight portion 456 of the sensor arm 450 has a first hole 462 at a first end 464 and a second hole 470 at a second end 471. The links 452 are parallel to one another and each includes a first end 474 having aligned holes 476, a middle section 478 having aligned holes 480, and a second end 482 having aligned slots 484. Each aligned slot 484 has a first end 483 and a second end 485. The second arm 454 has a first portion 486 with a hole 488 at a first end 490 and a flanged portion 492 with a second end 493. The second arm 454 is also pivotally mounted to the housing 32 by a pin 494.

The sensor arm 450 is connected to the second arm 454 by the links 452. A first pin 498 extends through and connects the aligned holes 476 of the links and the first hole 462 of the sensor arm locating the sensor arm between the links. A second pin 500 extends through and connects the aligned holes 480 of the links and pivotally mounts the links to the housing 32. A third pin 502 extends through and connects the slots 484 of the links and the hole 488 of the second arm 454 locating the second arm between the links. Preferably, the first, second, and third pins 498, 500, and 502 are each cold sweated to the links, respectively.

The sensor arm 450 is also pivotally mounted to the housing 32. The sensor arm 450 extends from within the interior 88 of the housing 32 to the exterior of the housing through the slot 86 in the second slanted wall 79. The flanged portion 458 of the sensor arm 450 fits within the slit 342 of the jaw 300. The links 452, the second arm 454, and the second end 493 of the sensor 40 are located within the interior 88 of the housing. The sensor arm is pivotally mounted to the housing by a pivot pin 504 which extends through and connects the mounting holes 87 of the tabs 81 and 83 of the second slanted wall 79 and the second hole 470 of the sensor arm 450 locating the sensor arm between the two tabs 81 and 83. The sensor arm may therefore pivot about the pivot pin 504 relative to the housing. Preferably, the pivot pin 504 is press fit to the tabs 81 and 83.

Figure 6:
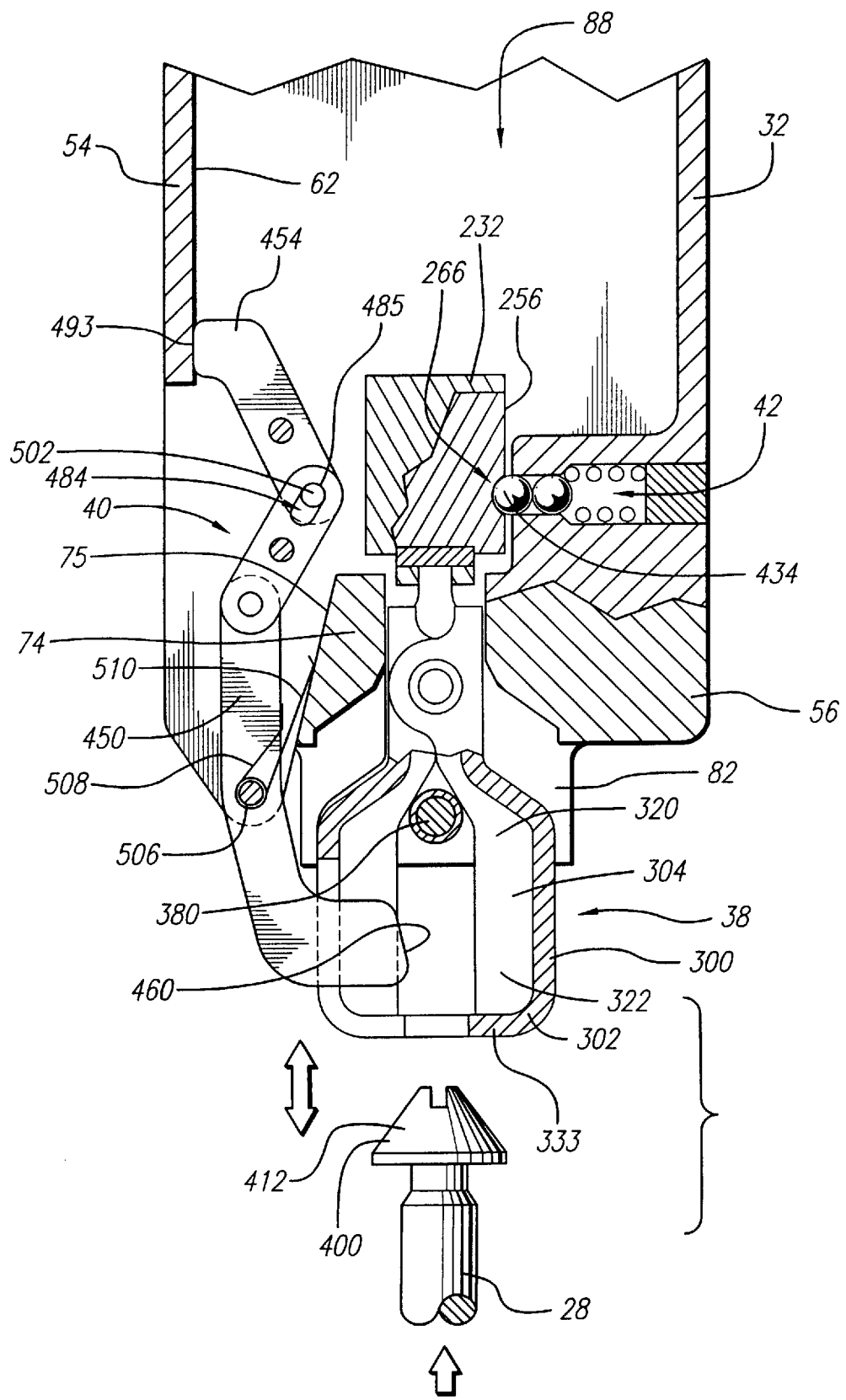
FIG. 6 is a partial sectional view similar to FIG. 5 of the overcenter double jaw latch mechanis in the pre-catch position disengaged from a keeper pin and illustrates the sensor in the blocking position.

With reference to FIG. 6, the sensor 40 has a blocking position in which the second end 493 of the sensor abuts the interior surface 62 of the second wall 54. As shown in FIG. 5, the sensor also has an unblocked position in which the second end 493 is located away from the interior surface of the second wall. A torsional spring 506 is coiled about the pivot pin 504. The spring 506 has a first leg 508 which bears against the sensor arm 450 and a second leg 510 which bears against the tapered end wall 75 of the double jaw mount 56. The spring biases the sensor 40 towards the blocking position.

As shown in FIG. 6, when the first end 460 of the sensor 40 does not abut the enlarged head 400 of the keeper pin 28, the spring 506 biases the sensor 40 to the blocking position.

In the blocking position, the third pin 502 is at the second end 485 of the slot 484 of the link 452 and the second arm 454 is positioned such that the second end 493 of the sensor abuts the interior surface 62 of the second wall 54.

As shown in FIG. 5, when the latch mechanism 20 is closed and the jaws 300 correctly engage the keeper pin 28, the first end 460 of the sensor 40 will abut the enlarged head 400 of the keeper pin such that the sensor arm 450 is rotated and the spring 506 is compressed translating the sensor to the unblocked position. In the unblocked position, the third pin 502 is moved to the first end 483 of the slot 484 of the link 452 translating the second arm 454 such that second end 493 of the sensor is moved away from the interior surface 62 of the second wall 54.

The operation of the double jaw latch mechanism 20 proceeds as follows. With reference to FIGS. 4 and 5, the latch mechanism 20 is in the closed position. It should be appreciated that FIGS. 4–11 illustrating the operation of the latch mechanism are sectional views and therefore the description of the operation as to the illustrated sectional view applies to the other corresponding sectional views of the latch mechanism.

When the latch mechanism 20 is properly closed, the cowling 22 is closed and the jaws 300 are closed around and rigidly locked to the keeper pin 28 which is mounted to the aircraft structure 24. The handle 148 is closed and flush relative to the housing 32 and the trigger lock 150 is closed and flush relative the handle. The hooked end 180 of the depending leg 178 of the trigger lock 150 engages the protruding end of the anchor pin 114. It should be noted that in FIG. 4, the trigger lock 150 is shown in an actuated position relative to the handle 148 and therefore the hooked end 180 does not engage the anchor pin as would regularly be the case when the latch mechanism is in the closed position.

In the closed position, the jaws 300 of the double jaw assembly 38 are trapped and forced together by the take-up cavity 85 of the housing 32. The semi-circular openings 338 of each end wall 333 form a circular keeper pin opening 340 when they are forced shut such that the jaws accept and rigidly lock the keeper pin 28 in place. The jaws 300 close around the second cylindrical portion 406 of the keeper pin 28 positioning the enlarged head 400 between the jaws 300. The jaws abut and are sandwiched between the shoulder 410 of the enlarged head and the tapered portion 405 of the shank 402 such that the keeper pin is prevented from escaping the jaws in the closed position. Advantageously, the double jaw assembly is trapped and forced shut by the take-up cavity which conforms to the shape of double jaw assembly. Therefore, the jaws of the double jaw assembly rigidly retain the keeper pin in the closed position.

In the closed position, the second ball 434 of the spring and ball assembly 42 is at a position 550 (indicated by phantom lines in FIG. 4) slightly below the concave depression 266 of the side wall 256 of the cam 232. When the latch mechanism 20 is closed and the jaws 300 correctly engage the keeper pin 28, the first end 460 of the sensor 40 will abut the enlarged head 400 of the keeper pin 28 such that the spring 506 is compressed and the sensor 40 is moved to its unblocked position.

It should be appreciated that the latch mechanism 20 is in an overcenter position when closed. As shown in FIG. 4, the center of the push rod 248 and the center of the connecting pin 272 are both to the left of, or overcenter, in relation to the center of the second mounting pin 210 thus providing the latch mechanism with an overcenter position. A line X—X drawn between the center of the push rod 248 and the center of the connecting pin 272 illustrate how these two centers are overcenter in relation to the center of the second mounting pin 210. The overcenter position of the push rod 248 and the connecting pin 272 forces the handle to rotate counter-clockwise about the second mounting pin 210 and consequently forces the linking mechanism 36 upwards. For example, when the cowling 22 encounters a force which tends to rotate the cowling clockwise towards it open position and consequently forces the latch mechanism clockwise away from the keeper pin 28, the overcenter position compels the handle to rotate counter-clockwise towards its closed position. The rotation of the handle counterclockwise forces the shaft arm 230 and the cam 232 of the linking mechanism 36 upwards such that the double jaw assembly 38 is forced upwards into the take-up cavity 85 and the jaws 300 are compelled together rigidly engaging the keeper pin 28. Therefore, forces which tend to open the cowling compel the latch mechanism towards its closed position. The overcenter position prevents the latch mechanism from inadvertently rotating out of the closed position until the handle and the latch mechanism are manually opened. Thus, the overcenter position of the latch mechanism advantageously establishes rigid retention of the cowling with the aircraft structure when the latch mechanism is closed. A further advantage of the linking mechanism 36 of the double jaw latch is that it provides a latch that is secure in the closed position, not prone to inadvertently open, maintains a controlled latching operation, and is inherently stable.

With reference to FIG. 4, the latch mechanism 20 is opened by a mechanic pushing the lower end of the upper wall 182 of the trigger lock 150 at a position 560 (indicated by an arrow), in opposition to the action of the spring 202, such that the trigger lock pivots counter-clockwise about the first mounting pin 200 and assumes an angled position relative to the handle 148. As the trigger lock is pivoted to the angled position the hooked end 180 of the depending leg 178 will disengage from the anchor pin 114. After the hooked end has disengaged from the anchor pin, the action of the spring 216 will force the handle assembly 34 to rotate clockwise about the mounting pin 210 such that the handle assembly will rotate out of the housing 32.

Figure 7:
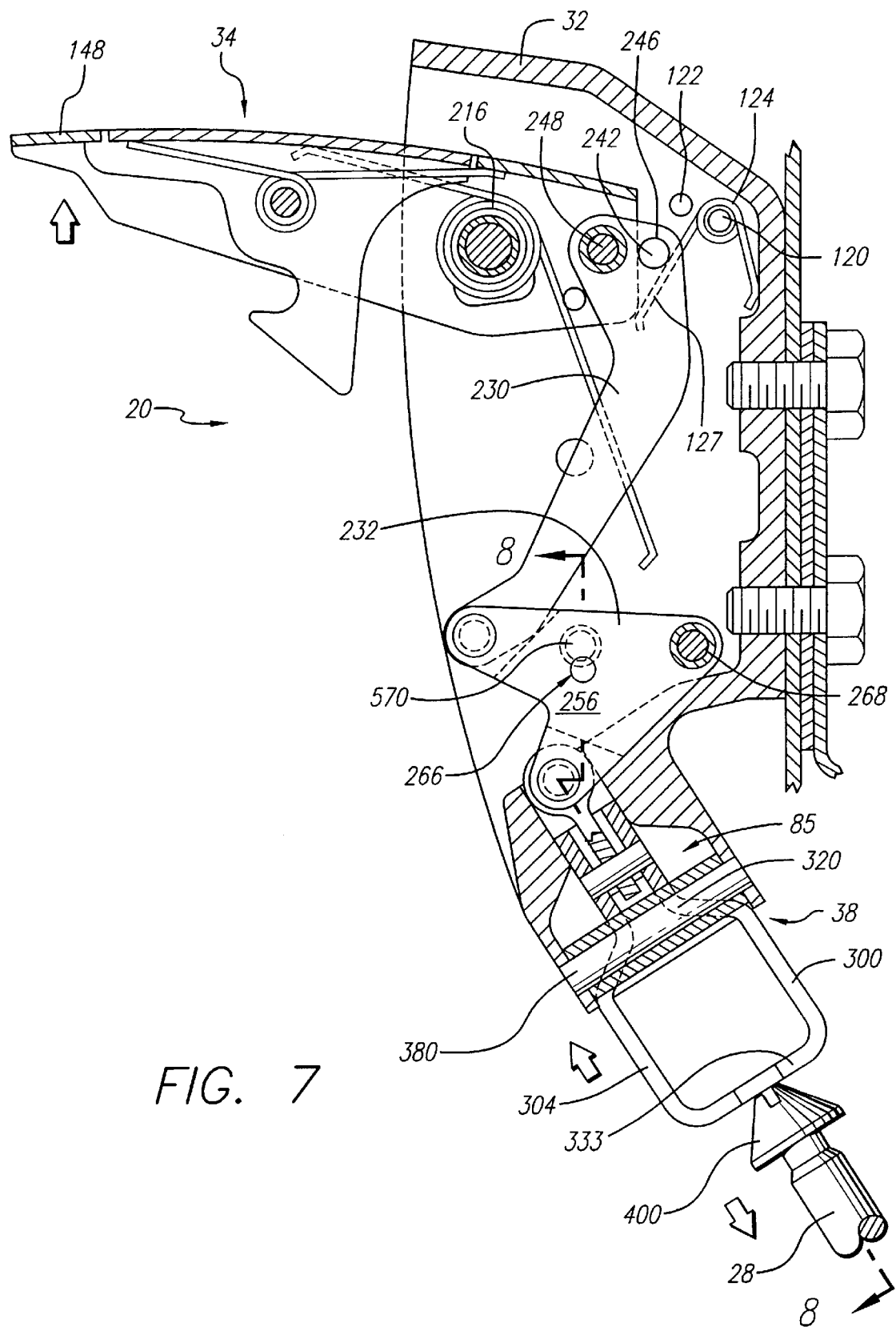
FIG. 7 is a sectional view similar to FIG. 4, showing the overcenter double jaw latch mechanism in the open position.
Figure 8:
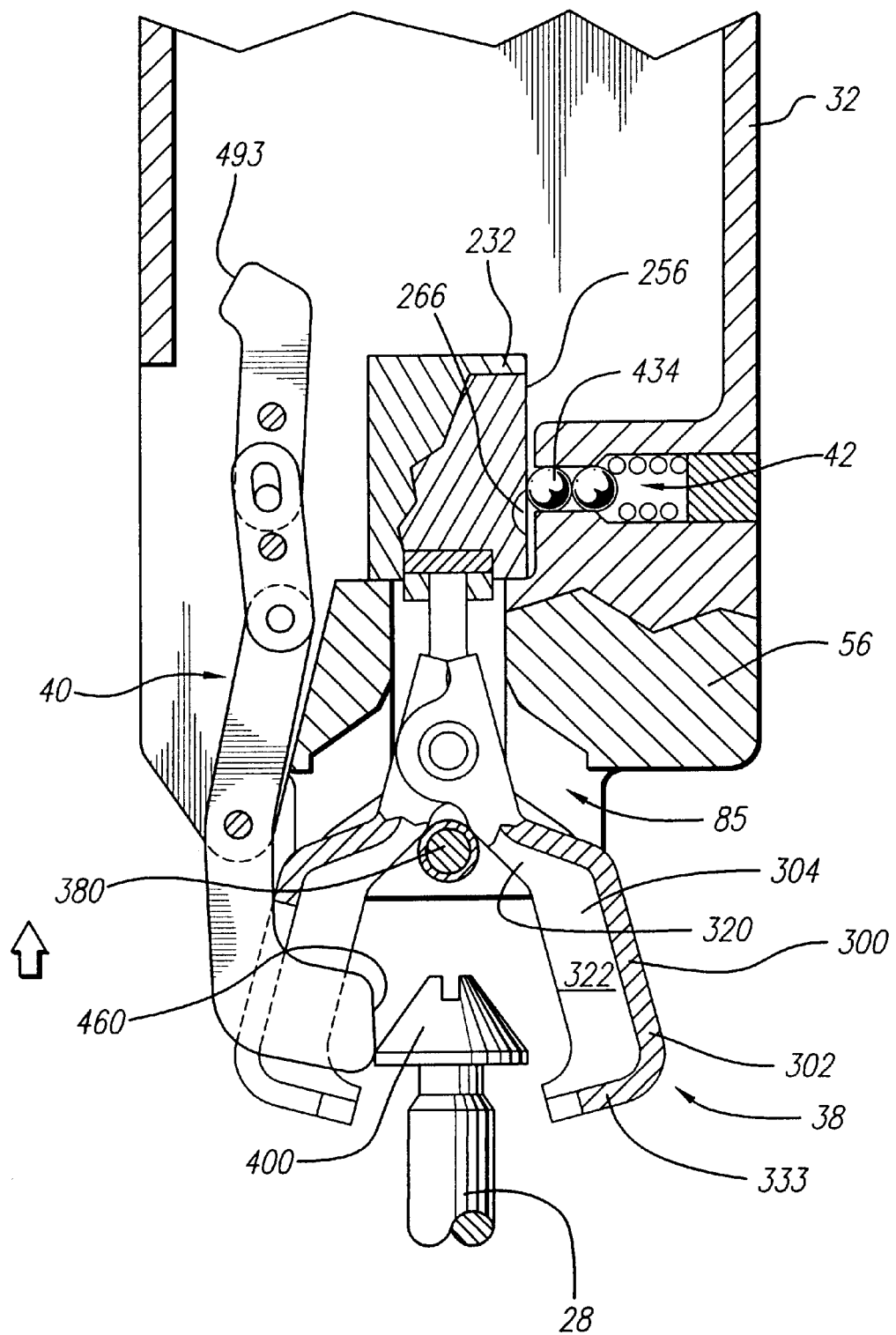
FIG. 8 is a partial sectional view similar to FIG. 5 of the overcenter double jaw latch mechanism en position.

With reference to FIGS. 7 and 8, after the handle assembly 34 has been forced out of the housing 32 by the action of the spring 216, the mechanic may then open the latch mechanism 20 by pushing the handle 148 upwards to its open position. As the mechanic pushes the handle upwards, the push rod 248 pushes the shaft arm 230 downwards towards the keeper pin 28. As the shaft arm 230 is pushed downwards the second side 246 of the biasing pin 242 compresses the second leg 127 of the spring 124. Furthermore, the shaft arm forces the cam 232 to rotate counter-clockwise about the cross pin 268 which in turn forces the double jaw assembly 38 downwards out of the take-up cavity 85. As the double jaw assembly 38 is force downwards out of the take-up cavity, the upper portion 320 of each side wall 304 of each jaw 300 will bear against the rolling pin 380 spreading the jaws 300 apart placing the double jaw assembly in the open position. In the open position the end walls 333 of the jaws 300 no longer engage the keeper pin 28 and are spread far enough apart such that they clear the enlarged head 400 of the keeper pin. Also, the second ball 434 of the spring and ball assembly 42 is located at a position 570 (indicated by phantom lines in FIG. 7) slightly above the concave depression 266 of the side wall 256 of the cam 232. Since the latch mechanism is in the open position and the jaws no longer engage the keeper pin 28, the cowling 22 can be pivoted upward to provides access to the engine for maintenance or repair. After the cowling is pivoted upwards the first end 460 of the sensor 40 will no longer abut the enlarged head 400 of the keeper pin 28 and the spring 506 will bias the sensor 40 to the blocking position, as shown in FIG. 6.

With reference to FIGS. 6 and 9–11, after the mechanic has opened the latch mechanism 20 by pushing the handle 148 upwards to the open position and has let loose of the handle, the handle and the latch mechanism will automatically move to the pre-catch position by the spring action of the second leg 127 of the spring 124 which forces the biasing pin 242 and the shaft arm 230 upwards. The pin 122 acts as a stop for the second leg 127. As the shaft arm is moved upwards the handle rotates downwards counterclockwise to the pre-catch position. The shaft arm's movement upwards forces the cam 232 to rotate clockwise about the cross pin 268 which in turn forces the double jaw assembly 38 upwards partially into the take-up cavity 85. As the double jaw assembly 38 is forced upwards into the take-up cavity, the upper portion 320 of each side wall 304 of each jaw 300 no longer bears against the rolling pin 380 such that the jaws 300 are no longer spread apart. The double jaw assembly assumes the pre-catch position and the jaws 300 and the end walls 333 confront one another and are urged together by the action of the spring 362 and the walls of the rectangular portion 82.

The spring and ball assembly 42 secures the latch mechanism 20 in the pre-catch position. The second ball 434 of the spring and ball assembly located at a position 580 (indicated by phantom lines in FIG. 9) engages the concave depression 266 of the side wall 256 of the cam 232 securing the latch mechanism, and particularly the jaws 300 of the double jaw assembly 38, in the pre-catch position.

After the required maintenance or repair the mechanic may pivot the cowling 22 downward and subsequently close the latch mechanism 20 by either closing the handle 148 or slamming the cowling 22 shut. Alternatively, the mechanic may pivot the cowling downward and slam the cowling shut, closing the latch mechanism, simultaneously. As the cowling is pivoted downwards the end walls 333 of the jaws 300 will bear against the conical cam face 412 of the enlarged head of 400 of the keeper pin 28 such that the jaws are spread apart to receive the keeper pin. The jaws will close around the keeper pin such that the second cylindrical portion 406 of the keeper pin is located within the circular keeper pin opening 340 and the enlarged head 400 is located between the jaws 300.

Sometimes the mechanic will pivot the cowling 22 downwards but will forget to close the latch mechanism 20. The pre-catch position of the double jaw assembly 38 provides a safety feature because the jaws 300 may still potentially accept the keeper pin 28, and later retain the keeper pin 28 during flight, even though the latch mechanism has not been closed. Furthermore, the latch mechanism and the jaws 300 of the double jaw assembly 38 will be secured in the pre-catch position by the action of the spring and ball assembly 42. Also, the jaws of the double jaw assembly will be urged together by the action of the spring 362 and the walls of the rectangular portion 82. Advantageously, the jaws may securely retain the keeper pin in the pre-catch position increasing the likelihood that the jaws will be able to retain the keeper pin during flight. Therefore, the chance of a potentially unsafe flight condition due to the cowling opening during the subsequent flight of the aircraft is decreased.

From the pre-catch position the mechanic can close the latch mechanism 20 and secure the cowling 22 to the aircraft structure 24 by either slamming the cowling shut or by simply closing the handle 148 if the cowling has already been pivoted downwards and the jaws 300 already properly engage the keeper pin 28. When the latch mechanism is closed, the double jaw assembly 38 with its jaws 300 securely sandwiched between the shoulder 410 and the tapered portion 405 of the keeper pin 28, will be forced upwards into the take-up cavity 85 closing the latch mechanism.

If the mechanic attempts to close the latch mechanism 20 by closing the handle 148 or slamming the cowling 22 downwards and the sensor 40 does not properly engage the keeper pin 28, as shown in FIG. 6, the sensor 40 will remain in the blocking position and will prevent the handle 148 and consequently the latch mechanism 20 from closing. When the first end 460 of the sensor 40 does not abut the enlarged head 400 of the keeper pin 28 the spring 506 biases the sensor 40 to the blocking position such that the second end 493 of the sensor abuts the interior surface 62 of the second wall 54. The second arm 454 of the sensor is positioned within the interior 88 of the housing 32 such that the flange 152 of the handle 148 will strike the second arm preventing the handle from closing. Consequently, the latch mechanism 20 will not close.

Figure 10:
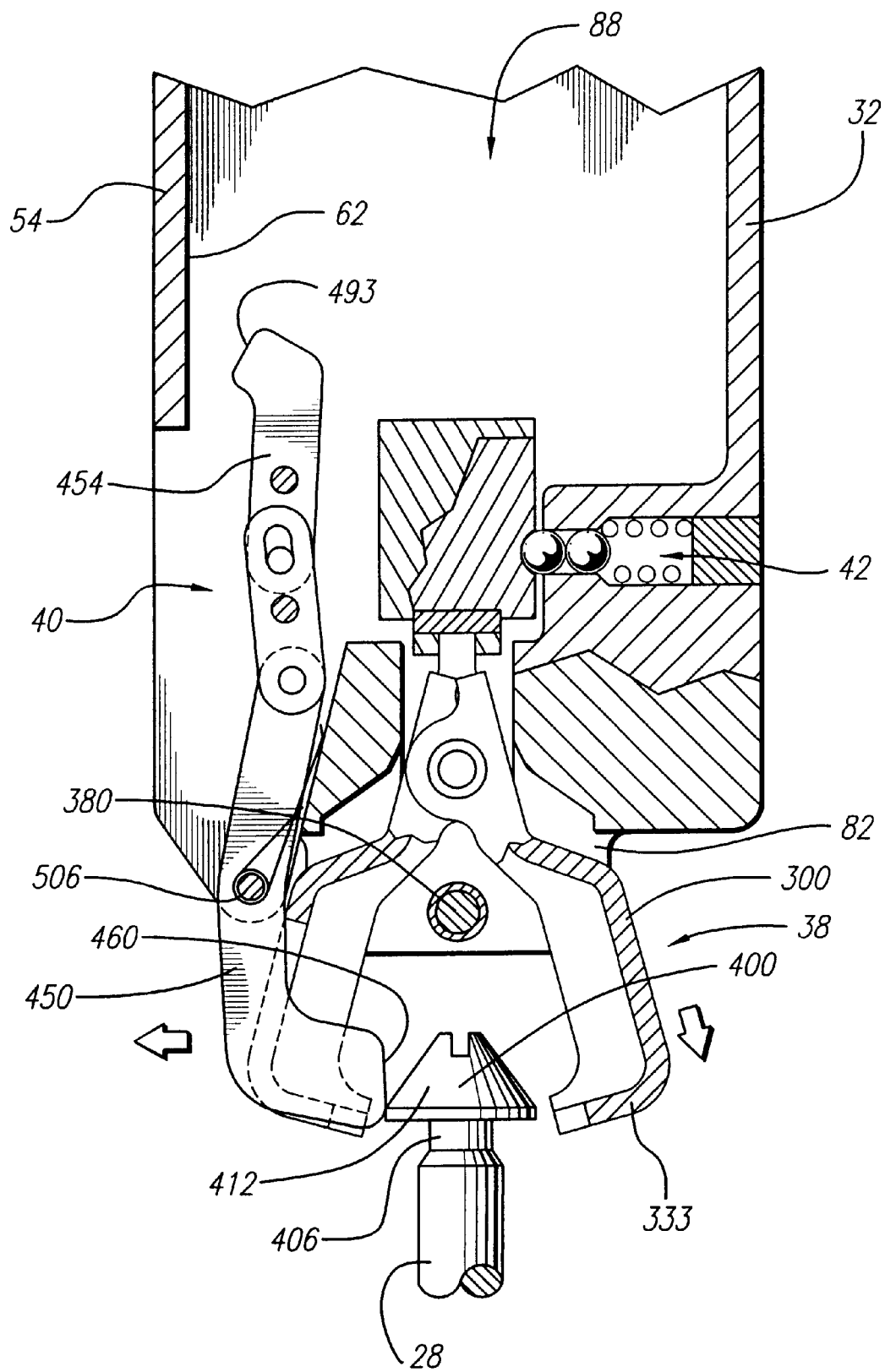
FIG. 10 is a partial sectional view similar to FIG. 5 of the overcenter double jaw latch mechanism in re-catch position engaging the keeper pin.

If the mechanic attempts to close the latch mechanism 20 by closing the handle 148 or slamming the cowling 22 downwards and the sensor 40 does properly engage the keeper pin 28, as shown in FIGS. 10 and 11, the sensor 40 will be in the unblocked position allowing the handle 148 and consequently the latch mechanism 20 to close. When the first end 460 of the sensor 40 properly abuts the enlarged head 400 of the keeper pin 28 the sensor arm 450 is rotated and the spring 506 is compressed such that the sensor assumes the unblocked position. In the unblocked position, the second end 493 of the sensor is located away from the interior surface 62 of the second wall 54. The second arm 454 of the sensor is positioned within the interior 88 of the housing 32 such that the flange 152 of the handle 148 will not strike the second arm and the handle is allowed to close without interference. Consequently, the latch mechanism 20 will close.

Advantageously, the operation of the sensor 40 insures that when the handle 148 is closed, that the keeper pin 28 is properly engaged, and that the latch mechanism 20 is properly closed. If the latch mechanism 20 did not properly close, as sometimes occurs in prior art devices where the latch can close without properly engaging the keeper pin, a potentially unsafe flight condition could occur. Advantageously, the sensor 40 of the present invention insures that when the handle 148 is closed, the latch mechanism is properly closed, and a potentially unsafe flight condition will probably not occur due to the jaws 300 of the double jaw assembly 38 not properly engaging the keeper pin 28. A further related advantage of the sensor is that when the latch mechanism does not close properly, the handle will pivot upwards visually alerting the mechanic that the latch mechanism has not closed properly. Conversely, when the handle does close, the mechanic can visually verify that the latch mechanism has indeed closed properly.

With reference to FIGS. 4 and 5, when the latch mechanism 20 closes properly the handle assembly 34 will rotate downwards counter-clockwise until it returns to a flush state with the housing 32. The angled surface 181 of the hooked end 180 of the depending leg 178 of the trigger lock 150 will override the action of torsional spring 202 as the angled surface bears against the anchor pin 114. Once the anchor pin passes across the angled surface of the hooked end, the hooked end will re-engage the protruding end of the anchor pin 114 and the trigger lock 150 will return to its flush state relative to the handle 148. Therefore, the handle 148 will return to its closed state where it is flush relative to the housing and the trigger lock will return to its closed state where it is flush relative to the handle.

As the handle assembly 34 moves downward, the shaft arm 230 moves upwards. The shaft arm's movement upwards forces the cam 232 to rotate clockwise about the cross pin 268 which in turn forces the double jaw assembly 38 upwards into the take-up cavity 85. The second ball 434 of the spring and ball assembly 42 returns to the position 550 (indicated by phantom lines in FIG. 4) slightly below the concave depression 266 of the side wall 256 of the cam 232. Also, when the latch mechanism closes properly the first end 460 of the sensor 40 will abut the enlarged head 400 of the keeper pin 28 such that the spring 506 is compressed and the sensor 40 is moved to its unblocked position. As the double jaw assembly 38 is forced upwards into the take-up cavity 85, the jaws 300 are trapped and forced together by the take-up cavity. As previously discussed, the jaws rigidly lock to the keeper pin 28 which is mounted to the aircraft structure 24. Therefore, the double jaw latch mechanism 20 securely mounts the cowling 22 to the aircraft structure 24.

Although the invention has been described in detail with reference to only a few preferred embodiments, those having ordinary skill in the art will appreciate that various modifications can be made without departing from the spirit of the invention. For example, it should be understood that this device could also be used to secure a variety of different aircraft panels on various types of aircraft. With such possibilities in mind, the invention is defined with reference to the following claims.

We claim:

1. A double jaw latch mechanism for releasably securing a moveable structure to a keeper, the double jaw latch mechanism comprising:

a housing;

a handle rotatably mounted to the housing, the handle having an open position, a closed position, and a pre-catch position;

a linking mechanism having a first end and a second end, wherein the handle is connected to the first end of the linking mechanism; and a double jaw assembly having an open position, a closed position, and a pre-catch position, the double jaw assembly connected to the second end of the linking mechanism, wherein the double jaw assembly includes a first jaw and a second jaw mounted in pivoted relation for movement to and from each other to engage the keeper;

a sensor, the sensor having a first end and a second end, the first end located adjacent to the keeper, wherein the sensor is pivotally connected to the housing;

wherein, in the open position, the jaws are spaced apart to permit disengagement with the keeper when the handle is in the open position;

wherein, in the closed position, the jaws are held together by the housing such that the jaws rigidly retain the keeper when the handle is in the closed position;

wherein, in the pre-catch position, the jaws are urged together such that the jaws may yield to pressure exerted by the keeper and may accept and retain the keeper, and thereafter securely retain the keeper when the handle is in the pre-catch position; and wherein if the handle is attempted to be rotated to the closed position and the first end of the sensor is not capable of abutting the keeper then the second end of the sensor will be positioned within the housing such that the sensor will prevent the handle from closing.

2. The double jaw latch mechanism of claim 1, wherein if the handle is attempted to be rotated to the closed position and the first end of the sensor is not capable of abutting the keeper then the second end of the sensor will be positioned within the housing such that the sensor will allow the handle to close.

3. A double jaw latch mechanism for releasably securing a moveable structure to a keeper, the double jaw latch mechanism comprising:

a housing;

a handle rotatably mounted to the housing, the handle having an open position, a closed position, and a pre-catch position;

a linking mechanism including a shaft having a first end and a second end, the handle connected to the first end of the shaft, and a cam having a first pivot, a second pivot, and a third pivot not in a line, wherein the second end of the shaft is connected to the first pivot of the cam;

a double jaw assembly having an open position, a closed position, and a pre-catch position, the double jaw assembly connected to the third pivot of the cam, wherein the double jaw assembly includes a first jaw and a second jaw mounted in pivoted relation for movement to and from each other to engage the keeper;

wherein, in the open position, the jaws are spaced apart to permit disengagement with the keeper when the handle is in the open position;

wherein, in the closed position, the jaws are held together by the housing such that the jaws rigidly retain the keeper when the handle is in the closed position; and wherein, in the pre-catch position, the jaws are urged together such that the jaws may yield to pressure exerted by the keeper and may accept and retain the keeper, and thereafter securely retain the keeper when the handle is in the pre-catch position.

4. The double jaw latch mechanism of claim 3, further comprising a take-up cavity conforming to the shape of the double jaw assembly, wherein after rotation of the handle to the open position the handle automatically rotates to the pre-catch position rotating the linking mechanism such that the double jaw assembly moves upwards retracting partially into the take-up cavity, the take-up cavity urging the jaws of the double jaw assembly together such that the double jaw assembly may accept and retain the keeper.

5. The double jaw latch mechanism of claim 3, further comprising a take-up cavity conforming to the shape of the double jaw assembly, wherein rotation of the handle to the closed position rotates the linking mechanism such that the doublejaw assembly moves upwards retracting into the take-up cavity, the take-up cavity forcing the double jaw assembly to the closed position such that the jaws of the double jaw assembly rigidly engage the keeper.

6. A double jaw latch mechanism for releasably securing a moveable structure to a keeper, the double jaw latch mechanism comprising:

a housing;

a handle rotatably mounted to the housing, the handle having an open position, a closed position, and a pre-catch position;

a shaft having a first end and a second end, wherein the handle is connected to the first end of the shaft;

a cam having a first pivot, a second pivot, and a third pivot not in a line, and a side, wherein the second end of the shaft is connected to the first pivot of the cam, and the cam includes a concave depression located at the approximate center of the side of the cam;

a double jaw assembly having an open position, a closed position, and a pre-catch position, the double jaw assembly connected to the third pivot of the cam, wherein the double jaw assembly includes a first jaw and a second jaw mounted in pivoted relation for movement to and from each other to engage the keeper; and a detent coupled to the cam, wherein the detent engages the cam such that the double jaw assembly is secured in the pre-catch position;

wherein, in the open position, the jaws are spaced apart to permit disengagement with the keeper when the handle is in the open position;

wherein, in the closed position, the jaws are held together by the housing such that the jaws rigidly retain the keeper when the handle is in the closed position; and wherein, in the pre-catch position, the jaws are urged together such that the jaws may yield to pressure exerted by the keeper and may accept and retain the keeper, and thereafter securely retain the keeper when the handle is in the pre-catch position.

7. The double jaw latch mechanism of claim 6, wherein the detent comprises a spring and a ball.

8. The double jaw latch mechanism of claim 6, wherein the shaft and the cam are in an overcenter position when the latch mechanism is closed, the overcenter position preventing the latch mechanism from inadvertently rotating out of the closed position until the handle is manually opened.

9. The double jaw latch mechanism of claim 6, further comprising a roller pin mounted within the interior of the housing between the first jaw and the second jaw, wherein rotation of the handle to the open position pushes the shaft downwards towards the keeper rotating the cam such that the double jaw assembly moves downwards extending out of the housing, forcing the first and second jaws against the roller pin, the roller pin spreading the first jaw and the second jaw apart placing the double jaw assembly into the open position allowing disengagement of the keeper from the double jaw assembly.

10. The double jaw latch mechanism of claim 6, further comprising a take-up cavity conforming to the shape of the double jaw assembly, wherein after rotation of the handle to the open position the handle automatically rotates to the pre-catch position pulling the shaft upwards away from the keeper rotating the cam such that the double jaw assembly moves upwards retracting partially into the take-up cavity, the take-up cavity urging the jaws of the double jaw assembly together such that the double jaw assembly may accept and retain the keeper.

11. The double jaw latch mechanism of claim 7, wherein after rotation of the handle to the open position the handle automatically rotates to the pre-catch position pulling the shaft upwards away from the keeper rotating the cam such that the ball of the detent engages the concave depression of the cam securing the double jaw assembly into the pre-catch position.

12. The double jaw latch mechanism of claim 6, further comprising a take-up cavity conforming to the shape of the double jaw assembly, wherein rotation of the handle to the closed position pulls the shaft upwards away from the keeper rotating the cam such that the double jaw assembly moves upwards retracting into the take-up cavity, the take-up cavity forcing the double jaw assembly to the closed position such that the jaws of the double jaw assembly rigidly engage the keeper.

13. The double jaw latch mechanism of claim 6, further comprising a sensor, the sensor having a first end and a second end, the first end located adjacent to the keeper, wherein the sensor is pivotally connected to the housing.

14. The double jaw latch mechanism of claim 13, wherein if the handle is attempted to be rotated to the closed position and the first end of the sensor is not capable of abutting the keeper then the second end of the sensor will be positioned within the housing such that the sensor will prevent the handle from closing.

15. The double jaw latch mechanism of claim 13, wherein if the handle is attempted to be rotated to the closed position and the first end of the sensor is capable of abutting the keeper then the second end of the sensor will be positioned within the housing such that the sensor will allow the handle to close.

16. A double jaw latch mechanism for releasably securing a moveable structure to a keeper, the double jaw latch mechanism comprising:

a housing;

a handle rotatably mounted to the housing, the handle having an open position, a closed position, and a pre-catch position;

a shaft having a first end and a second end, wherein the handle is connected to the first end of the shaft;

a cam having a first pivot, a second pivot, and a third pivot not in a line, and a side, wherein the second end of the shaft is connected to the first pivot of the cam, and the cam includes a concave depression located at the approximate center of the side of the cam;

a double jaw assembly having an open position, a closed position, and a pre-catch position, the double jaw assembly connected to the third pivot of the cam, wherein the double jaw assembly includes a first jaw and a second jaw mounted in pivoted relation for movement to and from each other to engage the keeper;

a detent coupled to the cam, wherein the detent comprises a spring and a ball, wherein after rotation of the handle to the open position the handle automatically rotates to the pre-catch position pulling the shaft upwards away from the keeper rotating the cam such that the ball of the detent engages the concave depression of the cam securing the double jaw assembly into the pre-catch position; and a sensor, the sensor having a first end and a second end, the first end located adjacent to the keeper, the sensor pivotally connected to the housing, wherein if the handle is attempted to be rotated to the closed position and the first end of the sensor is not capable of abutting the keeper then the second end of the sensor will be positioned within the housing such that the sensor will prevent the handle from closing;

wherein, in the open position, the jaws are spaced apart to permit disengagement with the keeper when the handle is in the open position;

wherein, in the closed position, the jaws are held together by the housing such that the jaws rigidly retain the keeper when the handle is in the closed position; and wherein, in the pre-catch position, the jaws are urged together such that the jaws may yield to pressure exerted by the keeper and may accept and retain the keeper, and thereafter securely retain the keeper when the handle is in the pre-catch position.

* * * * *